(12) United States Patent
Mitsuma et al.

(10) Patent No.: US 11,495,262 B1
(45) Date of Patent: Nov. 8, 2022

(54) DUPLEXING DATA FROM MULTIPLE FILE SYSTEMS ONTO A SHARED TAPE

(71) Applicant: International Business Machines Corporation, Armonk, NY (US)

(72) Inventors: Shinsuke Mitsuma, Machida (JP); Tsuyoshi Miyamura, Yokohama (JP); Noriko Yamamoto, Tokyo (JP); Hiroshi Itagaki, Yokohama (JP); Tohru Hasegawa, Tokyo (JP); Atsushi Abe, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/355,322

(22) Filed: Jun. 23, 2021

(51) Int. Cl.
*G11B 20/12* (2006.01)

(52) U.S. Cl.
CPC .. *G11B 20/1201* (2013.01); *G11B 2020/1291* (2013.01)

(58) Field of Classification Search
None
See application file for complete search history.

(56) References Cited

U.S. PATENT DOCUMENTS

| 5,757,572 | A | * | 5/1998 | Sasaki | G11B 27/3063 |
| 6,101,059 | A | * | 8/2000 | Wong | G11B 27/10 |
| 9,959,892 | B1 | * | 5/2018 | Miyamura | G11B 20/1201 |
| 10,168,920 | B2 | * | 1/2019 | Abe | G06F 3/0686 |
| 10,831,624 | B2 | | 11/2020 | Mitsuma | |
| 2006/0047905 | A1 | * | 3/2006 | Matze | G06F 3/0689 711/170 |
| 2009/0063748 | A1 | | 3/2009 | Bello | |
| 2017/0052718 | A1 | * | 2/2017 | Abe | G06F 3/0643 |
| 2017/0083437 | A1 | * | 3/2017 | Hasegawa | G06F 3/0652 |
| 2018/0196607 | A1 | | 7/2018 | Hasegawa | |
| 2020/0042607 | A1 | * | 2/2020 | Mitsuma | G06F 16/119 |
| 2020/0192578 | A1 | | 6/2020 | Sinha | |

OTHER PUBLICATIONS

"Sharing a tape library among multiple systems", downloaded from the Internet on Feb. 13, 2021, 2 pages, <https://www.ibm.com/support/knowledgecenter/en/SSLTBW_2.4.0/com.ibm.zos.v2r4.idao300/sharlib.htm>.

(Continued)

*Primary Examiner* — Peter Vincent Agustin
(74) *Attorney, Agent, or Firm* — Aaron N. Pontikos (57) ABSTRACT

A computer-implemented method for duplexing data from multiple files systems onto a shared tape is disclosed. The computer-implemented method includes receiving a unique identifier of a first tape image written to a primary storage device of a first client system. The computer-implemented method further includes determining that a position of a first end-of-data marker on the first tape image differs from a position of a second end-of-data marker on a tape corresponding to the unique identifier of the first tape image. Responsive to determining that the position of the first end-of-data marker on the first tape image differs from the position of the second end-of-data marker on the tape corresponding to the unique identifier of the first tape image, the computer-implemented method further includes copying a difference in data between the second end-of-data marker on the tape and be first end-of-data marker on the first tape image to the tape.

20 Claims, 6 Drawing Sheets

(56) References Cited

OTHER PUBLICATIONS

"XenData Launches File System Mirroring Software—The Broadcast Bridge—Connecting IT to Broadcast," downloaded from the Internet on Feb. 21, 2021, 3 pages, <https://www.thebroadcastbridge.com/content/entry/12299/xendata-launches-file-system-mirroring-software>.

Abe, Atsushi, "LTFS File Backend", Linear Tape File System, Github, Jul. 10, 2018, 5 pages, <https://github.com/LinearTapeFileSystem/ltfs/wiki/The-file-backend>.

Mell et al., "The NIST Definition of Cloud Computing", Recommendations of the National Institute of Standards and Technology, NIST Special Publication 800-145, Sep. 2011, 7 pages.

\* cited by examiner

DUPLEXING DATA FROM MULTIPLE FILE SYSTEMS ONTO A SHARED TAPE

BACKGROUND

The present invention relates generally to backing up file system data, and more particularly to duplicating file system data from multiple computing systems via a shared tape drive.

A tape drive is a data storage device that reads and writes data on magnetic tape media or simply tape. Current tape data storage technology allows for a tape to be divided into separately writable areas, known as partitions. For example, a tape may be divided into an Index Partition and one or more Data Partitions. With the advent of tape partitions, a tape format and file system, known as the Linear Tape File System (LTFS) further allowed for files stored on tape to be utilized in a similar manner to other external storage devices, such as a hard disk or flash drive. The LTFS requires both a specific format of data on the tape and software to provide a file system interface to the data. Each LTFS formatted tape appears as a separate folder under the filesystem mount point. Applying a file system to a tape drive allows users to organize and search the contents of tape media as they would on hard disk, improving access time for data stored on tape.

There currently exist two primary ways of backing up or duplicating file system data—mirroring and duplexing. Data mirroring refers to the copying of data from one storage device to a second, additional storage device. With data mirroring, a single storage controller is shared between two storage devices. However, since each storage device relies upon a common storage controller, access to both copies of data is threatened if the storage controller fails. Data duplexing is a variation of data mirroring that uses redundant storage controllers. In other words, each storage device is connected to its own storage controller. This is advantageous in that access to a copy of the data can be achieved as long as one of the storage controllers is operational.

SUMMARY

According to one embodiment of the present invention, a computer-implemented method for duplexing data from multiple file systems onto a shared tape is disclosed. The computer-implemented method includes receiving a unique identifier of a first tape image written to a primary storage device of a first client system. The computer-implemented method further includes determining that a position of a first end-of-data marker on the first tape image differs from a position of a second end-of-data marker on a tape corresponding to the unique identifier of the first tape image. Responsive to determining that the position of the first end-of-data marker on the first tape image differs from the position of the second end-of-data marker on the tape corresponding to the unique identifier of the first tape image, the computer-implemented method further includes copying a difference in data between the second end-of-data marker on the tape and the first end-of-data marker on the first tape image to the tape.

According to another embodiment of the present invention, a computer program product for duplexing data from multiple file systems onto a shared tape drive is disclosed. The computer program product includes one or more computer readable storage media and program instructions stored on the one or more computer readable storage media. The program instructions include instructions to receive a unique identifier of a first tape image written to a primary storage device of a first client system. The program instructions further include instructions to determine that a position of a first end-of-data marker on the first tape image differs from a position of a second end-of-data marker on a tape corresponding to the unique identifier of the first tape image. The program instructions further include, responsive to determining that the position of the first end-of-data marker on the first tape image differs from the position of the second end-of-data marker on the tape corresponding to the unique identifier of the first tape image, instructions to the computer-implemented method further includes copy a difference in data between the second end-of-data marker on the tape and the first end-of-data marker on the first tape image to the tape.

According to another embodiment of the present invention, a computer system for duplexing data from multiple file systems to a shared tape is disclosed. The computer system includes one or more computer system includes one or more computer processors, one or more computer readable storage media, and program instructions stored on the computer readable storage media for execution by at least one of the one or more processors. The program instructions include instructions to receive a unique identifier of a first tape image written to a primary storage device of a first client system. The program instructions further include instructions to determine that a position of a first end-of-data marker on the first tape image differs from a position of a second end-of-data marker on a tape corresponding to the unique identifier of the first tape image. The program instructions further include, responsive to determining that the position of the first end-of-data marker on the first tape image differs from the position of the second end-of-data marker on the tape corresponding to the unique identifier of the first tape image, instructions to the computer-implemented method further includes copy a difference in data between the second end-of-data marker on the tape and the first end-of-data marker on the first tape image to the tape.

DETAILED DESCRIPTION

The present invention relates generally to backing up file system data, and more particularly to duplicating file system data from multiple computing systems via a shared tape drive.

Current data duplexing systems that utilize tape as a backup storage device require that a separate tape drive be connected to each computing system. However, embodiments of the present invention recognize that this requirement can impose increased infrastructure and maintenance costs for small-scale businesses, such as small office or home office (SOHO) environments. Embodiments of the present invention further recognize that storage capacities of current tape cartridges far exceed the amount of storage required by most small-scale businesses.

Embodiments of the present invention address the aforementioned challenges of current data duplexing systems by providing the capability to extend current data duplexing systems that utilize tape as a backup storage device to the client/server model. According to embodiments of the present invention, backup copies of data generated from multiple, distinct computing systems are written to a single tape via a shared tape drive. The use of a shared tape and tape drive between multiple, distinct computing systems allows for the use of tape as a backup storage option at reduced cost for small-scale businesses.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. Notwithstanding, several definitions that apply throughout this document now will be presented As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" and "dynamically" mean without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

The terms first, second, etc. may be used herein to describe various elements. These elements should not be limited by these terms, as these terms are only used to distinguish one element from another unless stated otherwise or the context clearly indicates otherwise.

Figure 1:
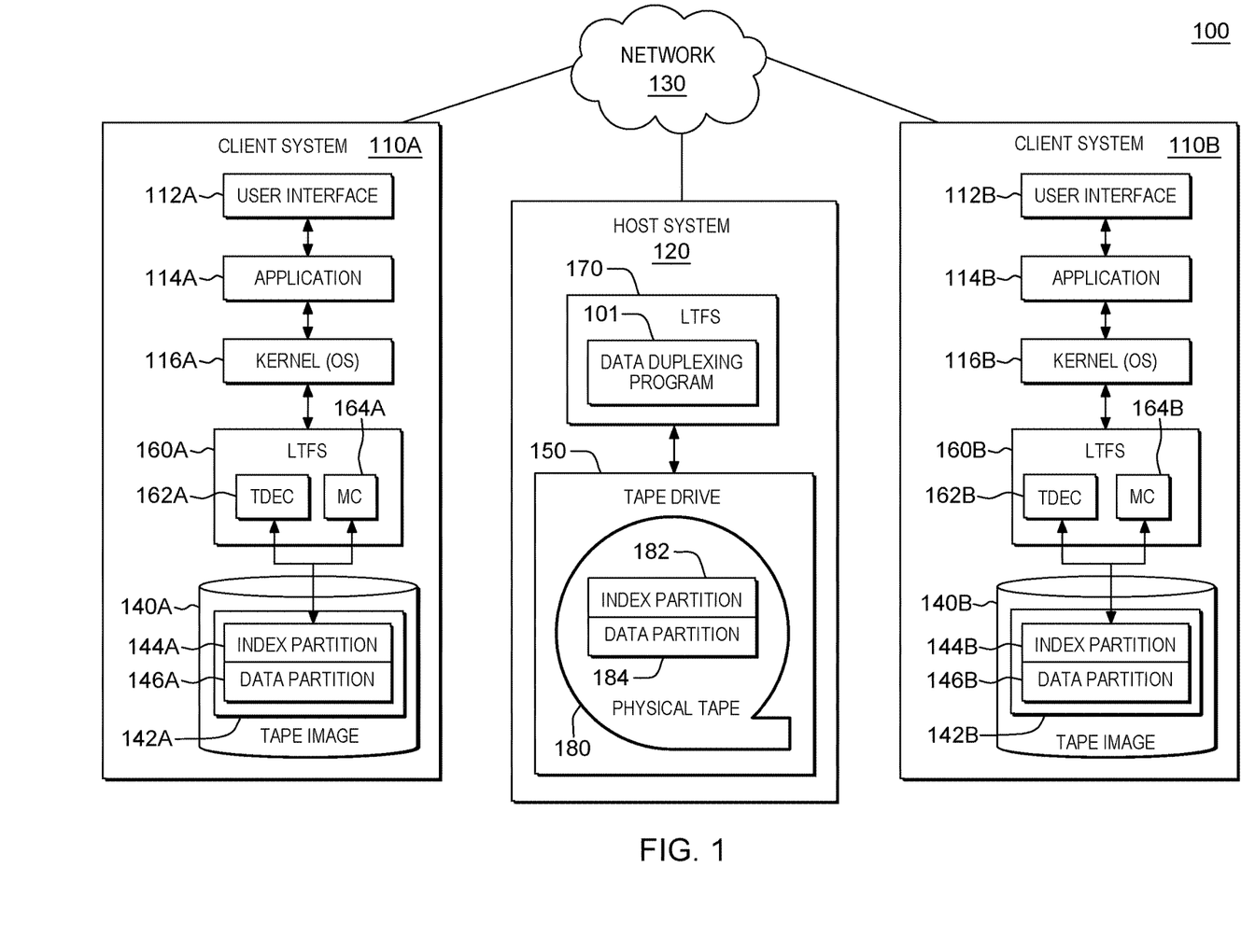
FIG. 1 is a functional block diagram of a data duplexing computing environment, generally designated 100, suitable for operation of a data duplexing program 101 in accordance with at least one embodiment of the invention.

The present invention will now be described in detail with reference to the Figures. FIG. 1 is a functional block diagram of a data duplexing computing environment, generally designated 100, for backing up data generated from multiple, distinct computing devices onto a single tape via a shared tape drive in accordance with at least one embodiment of the present invention. In an embodiment, data duplexing computing environment 100 may be provided by cloud computing environment 50, as described with reference to FIG. 5, in accordance with at least one embodiment of the present invention.

FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Data duplexing computing environment 100 includes client system 110A, client system 110B, and host system 120 interconnected over network 130. Although only depicted as including a single host system and two client systems, data duplexing computing environment 100 may include any number of additional host and client systems. In embodiments of the invention, network 130 can be a telecommunications network, a local area network (LAN), a wide area network (WAN), such as the Internet, or a combination of the three, and can include wired, wireless, or fiber optic connections. In embodiments of the invention, network 130 is a storage area network (SAN). In an embodiment, network 130 is network attached storage (NAS). Network 130 may include one or more wired and/or wireless networks that are capable of receiving and transmitting data, voice, and/or video signals, including multimedia signals that include voice, data, and video information. In general, network 130 may be any combination of connections and protocols that will support communications between client system 110A, client system 110B, host system 120, and other computing devices (not shown) within data duplexing computing environment 100.

In an embodiment, client systems 110A and 110B (collectively referred to herein as client system 110) can represent a computing device of an end user, such as a mobile device, laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, client systems 110A and 110B can represent any programmable electronic device or combination of programmable electronic devices capable of executing machine readable program instructions and communicating with host system 120, and other devices (not depicted) via a network, such as network 130.

In an embodiment, client systems 110A and 110B are computing devices that can be a standalone device, a management server, a web server, an application server, a mobile device, or any other electronic device or computing system capable of receiving, sending, and processing data. In an embodiment, client systems 110A and 110B represent server computing systems utilizing multiple computers as a server system, such as in a cloud computing environment. In an embodiment, client systems 110A and 110B represent computing systems utilizing clustered computers and components (e.g. database server computer, application server computer, web server computer, webmail server computer, media server computer, etc.) that act as a single pool of seamless resources when accessed within data duplexing computing environment 100. In general, client systems 110A and 110B represent any programmable electronic devices or combination of programmable electronic devices capable of executing machine readable program instructions and communicating with each other, as well as with host system, and other computing devices (not shown) within data duplexing computing environment 100 via a network, such as network 130.

Figure 4:
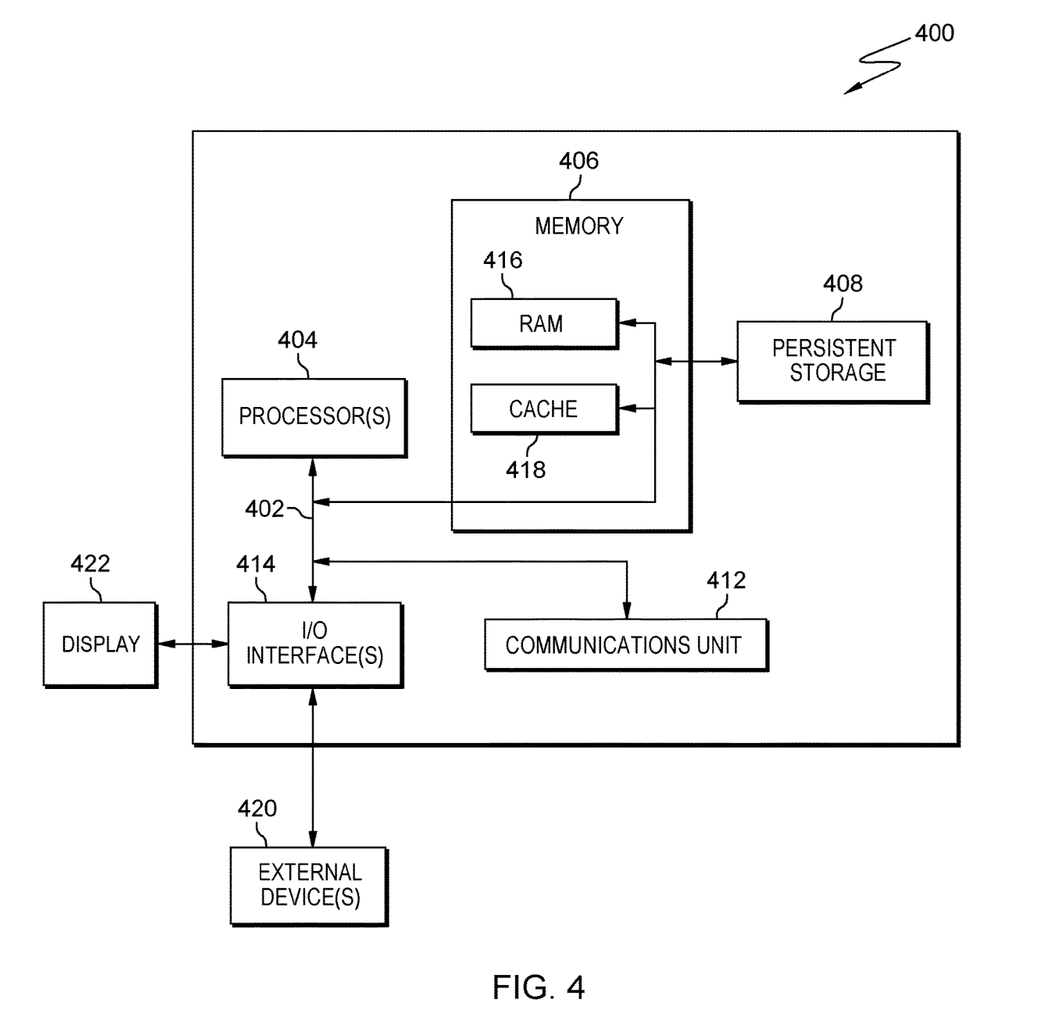
FIG. 4 is a block diagram depicting components of a computer device 400 suitable for executing a data duplexing program 101 in accordance with at least one embodiment of the invention.

Client systems 110A and 110B may include components, as depicted and described in further detail with respect to computing device 400 of FIG. 4, in accordance with embodiments of the present invention. Client systems 110A and 110B may include components as depicted and described in further detail with respect to cloud computing node 10 of cloud computing environment 50 of FIG. 5.

User interface 112A and 112B are programs that provide an interface between a user of an end user device, such as client systems 110A and 110B, and a plurality of applications that reside on the device (e.g., application 114A or 114B). A user interface, such as user interface 112A and 112B, refers to the information (such as graphic, text, and sound) that a program presents to a user, and the control sequences the user employs to control the program. A variety of types of user interfaces exist. In one embodiment, user interface 112A and 112B are graphical user interfaces. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112A and 112B are scripts or application programming interfaces (APIs).

Application 114A and 114B can be representative of one or more applications (e.g., an application suite) that operate on client systems 110A and 110B, respectively. In an embodiment, application 114A and 114B may further include one or more components, such as add-ons or plug-ins installed on client system 110. In yet another example, application 114 can be representative of a host system application that is integrated or embedded within an application for backing up data, such as data duplexing program 101 operating on host system 120.

In an embodiment, host system 120 is a computing device that can be a standalone device, a management server, a web server, an application server, a mobile device, or any other electronic device or computing system capable of receiving, sending, and processing data. In an embodiment, host system 120 represents a server computing system utilizing multiple computers as a server system, such as in a cloud computing environment. In an embodiment, host system represents a computing system utilizing clustered computers and components (e.g. database server computer, application server computer, web server computer, webmail server computer, media server computer, etc.) that act as a single pool of seamless resources when accessed within data duplexing computing environment 100. In general, host system 120 represents any programmable electronic device or combination of programmable electronic devices capable of executing machine readable program instructions and communicating with each other, as well as with client system 110A, client system 110B, hard disk drives 140A, hard disk drives 140B, and other computing devices (not shown) within data duplexing computing environment 100 via a network, such as network 130.

Hard disk drives 140A and 140B (collectively referred to herein as Hard disk drives 140) are primary storage devices that may be installed on client systems 110A and 110B, respectively, or may be external to client systems 110A and 110B, and accessed via network 130. Hard disk drives 140 may be one or more independent hard disk drives, multiple hard disk drives in a redundant array of independent disks (RAID), and may take the form of other storage devices such as a solid-state storage device (SSD) or a USB storage device.

Hard disk drives 140A and 140B further include tape images 142A and 142B (collectively referred to herein as tape image 142), respectively. Although only depicted as including a single tape image, hard disk drives 140A and 140B may include any number of tape images. Tape images 142A and 142B further include a pair of LTFS partitions—one Data Partition (DP) and one Index Partition (IP)—that contain a logical set of files and directories to the files. As depicted, tape image 142A includes IP 144A and DP 146A, and tape image 142B includes IP 144B and DP 146B (collectively referred to herein as IP 144 and DP 146). In an embodiment, a separate tape image is created for each volume formatted into a separate filesystem on HDD 140.

The term "file" as used herein shall refer to a group of logically related data extents together with associated file meta-data. The term "data extent" as used herein shall refer to a contiguous sequence of recorded blocks (i.e., a set of one or more sequential logical blocks used to store file data). In an embodiment, a file is recorded as one or more extents and each extent corresponds to one or more records. In an embodiment, all records within a data extent have a predetermined storage length (also known as the "block size"). In an embodiment, the default block size is 512 KB or 0.5 MB. In an embodiment, the default block size is 1,024 KB or 1 MB. However, it should be appreciated that the default block size may be any predetermined size.

In an embodiment, the mapping from file byte offsets to block positions is maintained in the index partition of a tape image and is generally referred to as an extent list. Each entry in an extent list for a file encodes a range of bytes in the file as a range of contiguous bytes in a data extent. Each data extent included in the extent list includes the following information:
  (i) Start Block—the block number within the data extent where the content for the extent begins;
  (ii) Byte Offset—the number of bytes from the beginning of the start block to the beginning of the file data for the extent.
  (iii) Byte Count—the number of bytes of file content in the data extent; and
  (iv) File Offset—the number of bytes from the beginning of the file to the beginning of the file data recorded for the extent.

Tape drive 150 is a secondary storage device that may be installed on host system 120, or may be external to host system 120, and accessed via network 130. In an embodiment, tape drive 150 is a tape library (i.e., an automated tape storage device that includes one or more tape drives for writing to and reading from tape media, such as single-reel or two-reel magnetic tape cartridges. In an embodiment, tape drive 150 is representative of one or more tape drives, one or more slots to hold tape media, a barcode reader to identify tape media and an automated method (e.g., a robot) for loading tape media onto a tape drive. For example, tape drive 150 may be an IBM TS3400™ Tape Library or an IBM TS3500™ Tape Library. While reference is made to IBM-specific hardware and/or software components, it should be understood that aspects of the present invention may be applied equally to other tape library technologies. In an embodiment, secondary storage device includes one or more tape media stored in banks or groups of storage slots.

Tape 180 is a tape storage media that may take the form of any known types of tape media, including, but not limited to magnetic tape cartridges, magnetic tape cassettes, and optical tape cartridges. In an embodiment, tape 180 is shared between client system 110A and 110B for the purpose of mirroring or duplexing changes to data written to tape image 142A on HDD 140A and tape image 142B on HDD 140B to tape 180. Tape 180 further includes a pair of LTFS partitions—index partition (IP) 182 and data partition (DP) 184—that contain a logical set of files and directories to the files. In an embodiment, IP 182 and DP 184 are formatted in the same manner as IP 142 and DP 144. Organizing or partitioning the tape in such a way enables tape 180 to be self-describing through the use of a file index in IP 182. This results in reducing the complexity of data management and data access time for tape storage.

Client systems 110A and 110B further include linear tape file system (LTFS) 160A and LTFS 160B (collectively referred to herein as LTFS 160). In an embodiment, client systems 110A and 110B mount and execute distinct file systems. The file systems used have the operational properties of a LTFS, such as LTFS 160A and LTFS 160B. LTFS 160 can perform direct access to files stored on a tape cartridge in a similar fashion to files stored on a hard disk drive or flash drive. It requires both a specific format of data on the tape cartridge and software to provide a file system interface to the data. Each LTFS formatted tape cartridge appears as a separate folder under the filesystem mount point. For example, LTFS 160 can be an IBM Linear Tape File System—Library Edition (LTFS-LE) that allows LTFS volumes to be used with a tape library. One of ordinary skill in the art will appreciate that applying a file system to a tape drive allows users to organize and search the contents of tape media as they would on hard disk, improving access time for data stored on magnetic tape. While reference is made to IBM-specific hardware and/or software components, it should be understood that aspects of the present invention may be applied equally to other tape storage technologies.

LTFS 160A and LTFS 160B further include tape drive emulation component (TDEC) 162A and 162B (collectively referred to herein as TDEC 162), and mirroring component (MC) 164A and 164B (collectively referred to herein as MC 164), respectively. In an embodiment, a user of client system 110 utilizes application 114 to issue a command that generates a file I/O request (e.g., a copy command), to an operating system (not depicted) of client system 110, in which the operating system subsequently passes the file I/O request to LTFS 160 in a random block access format, such as the format of a file allocation table (FAT) or new technology file system (NTFS). If the file I/O request is a write request, TDEC 162 converts the write request received by LTFS 160 into data to be written to a tape by tape drive 150 and records the data as a tape image file on HDD 160. In an embodiment, the content of files, or records, are converted by TDEC 162 to a tape image format and written to DP 146 on HDD 140.

MC 164 performs data mirroring (duplexing) operations. MC 164 copies data changes made to HDD 140 and sends these data changes to data duplexing program 101, in which data duplexing program 101 writes the data changes to TD 150. For example, MC 164 reads the tape image from HDD 140, independent of TDEC 162 operations, and sequentially copies the tape image differences between HDD 140 and TD 150. In an embodiment, the mirroring operations, or copying of data record changes to HDD 140 to TD 150 is performed asynchronously, independent of processing I/O requests submitted from application 114, and read/write requests may continue to be received from application 114 and performed on HDD 140 without confirmation of the completion of copied data records to TD 150.

In an embodiment, MC 164 asynchronously monitors whether the data written to tape image 142 on HDD 140 is consistent with data written to tape 180. In an embodiment, MC 164 determines whether a difference exists between the EOD position of file data written to tape image 142 on HDD 140, and an actual EOD position on tape 180. If the EOD position of tape image 142 exceeds the actual EOD position on tape 180, MC 164 copies records ranging from the actual EOD position on tape 180 to the current EOD position on tape image 142. Since LTFS is a write-once file system, TDEC 162 always appends data from the EOD position on tape image 142. Therefore, if an EOD position on tape image 142 is different from an EOD position on tape 180, MC 164 copies records ranging from the actual EOD position on tape 180 to the current EOD position on tape image 142.

Host system 120 further includes data duplexing program 101 and linear tape file system (LTFS) 170. LTFS 170 can perform direct access to files stored on a tape cartridge, such as tape 180, in a similar fashion to files stored on a hard disk drive, such as HDD 140. It requires both a specific format of data on the tape cartridge and software to provide a file system interface to the data. Each LTFS formatted tape cartridge appears as a separate folder under the filesystem mount point. For example, LTFS 170 can be an IBM Linear Tape File System—Library Edition (LTFS-LE) that allows LTFS volumes to be used with a tape library. One of ordinary skill in the art will appreciate that applying a file system to a tape drive allows users to organize and search the contents of tape media as they would on hard disk, improving access time for data stored on magnetic tape. While reference is made to IBM-specific hardware and/or software components, it should be understood that aspects of the present invention may be applied equally to other tape storage technologies.

In an embodiment, data duplexing program 101 operates on a central server, such as host system 120, and can be utilized by one or more client systems, such as client system 110A and client system 110B, via an application download from host system 120 or a third-party application stored and executed on client system 110A and client system 110B. In an embodiment, data duplexing program 101 may be software, downloaded from a central server, such as host system 120, and installed on one or more client systems, such as client system 110A and client system 110B. In an embodiment, data duplexing program 101 may be utilized as a software service provided by a third-party cloud service provider (not shown). In an embodiment, data duplexing program 101 may include one or more components (not shown), such as add-ons, plug-ins, and agent programs, etc., installed on one or more client systems, such as client system 110A and client system 110B, to provide data duplexing between HDD 140 and tape 180. For example, TDEC 162A, 162B and MC 164A, 164B operating on client systems 110A and 110B, respectively, may be components of data duplexing program 101 operating on host system 120.

Data duplexing program 101 performs data mirroring operations between data stored on a primary storage device, such as a HDD and a secondary storage device, such as a tape drive. In an embodiment, data duplexing program 101 receives a unique identifier (hereinafter referred to as a volume identifier (VID)) from MC 164 and a LTFS block size (BS) corresponding to the tape image. The VID uniquely identifies a tape image on HDD 140. In an embodiment, in response to receiving the VID corresponding to the tape image and LTFS BS of the tape image from MC 164, data duplexing program 101 transmits an EOD position on tape 180 corresponding to the VID to MC 164. For example, if data duplexing program 101 receives the VID 123456 from MC 164, then data duplexing program 101 searches tape 180 for a file name starting with 123456 and ending with E or EOD, whereby an EOD position on tape 180 corresponding to a VID corresponding to tape image 142 can be identified from the file name.

If MC 164 determines that the EOD position of the tape image exceeds the EOD position on tape 180 corresponding to the tape image, MC 164 copies data ranging from the EOD position on tape 180 to the current EOD position on the tape image and transmits the copied data, including data records, file markers, and an EOD marker to data duplexing program 101. In an embodiment, the copied data received by data duplexing program 101 are written to tape 180 as one or more LTFS files. It should be appreciated that unlike current duplexing systems, which write data (records, file markers, and EOD markers) copied from a HDD to a tape as raw data, embodiments of the present invention write data (records, file markers, and EOD markers) copied from a HDD to a tape as LTFS formatted files.

In an embodiment, data duplexing program 101 appends at least one of a VID and BS corresponding to data copied from a particular tape image and records the data on tape 180 as an LTFS file. For example, data received from MC 164 with VID=123456 and BS=512K are saved as LTFS files on tape 180 with the following names given to a file:
Partition=1|Record
    Number=499|Type=FM→123456_512K_1_499_F
Partition=1|Record                     Number=500-
    509|Type=R→123456_512K_1_500-509_R
Partition=1|Record
    Number=510|Type=EOD→123456_512K_1_510_E Embodiments of the present invention recognize that writing data received from MC 164 on a per record basis to tape 180 may result in a large number of LTFS indexes written to tape 180. Thus, embodiments of the present invention advantageously reduce the number of LTFS indexes written to tape 180 when writing data received from MC 164 based on writing data to tape 180 on a per file basis. In other words, data duplexing program 101 processes one or more records received from MC 164 as a single file on a LTFS, such as LTFS 170 on host system 120.

Figure 2:
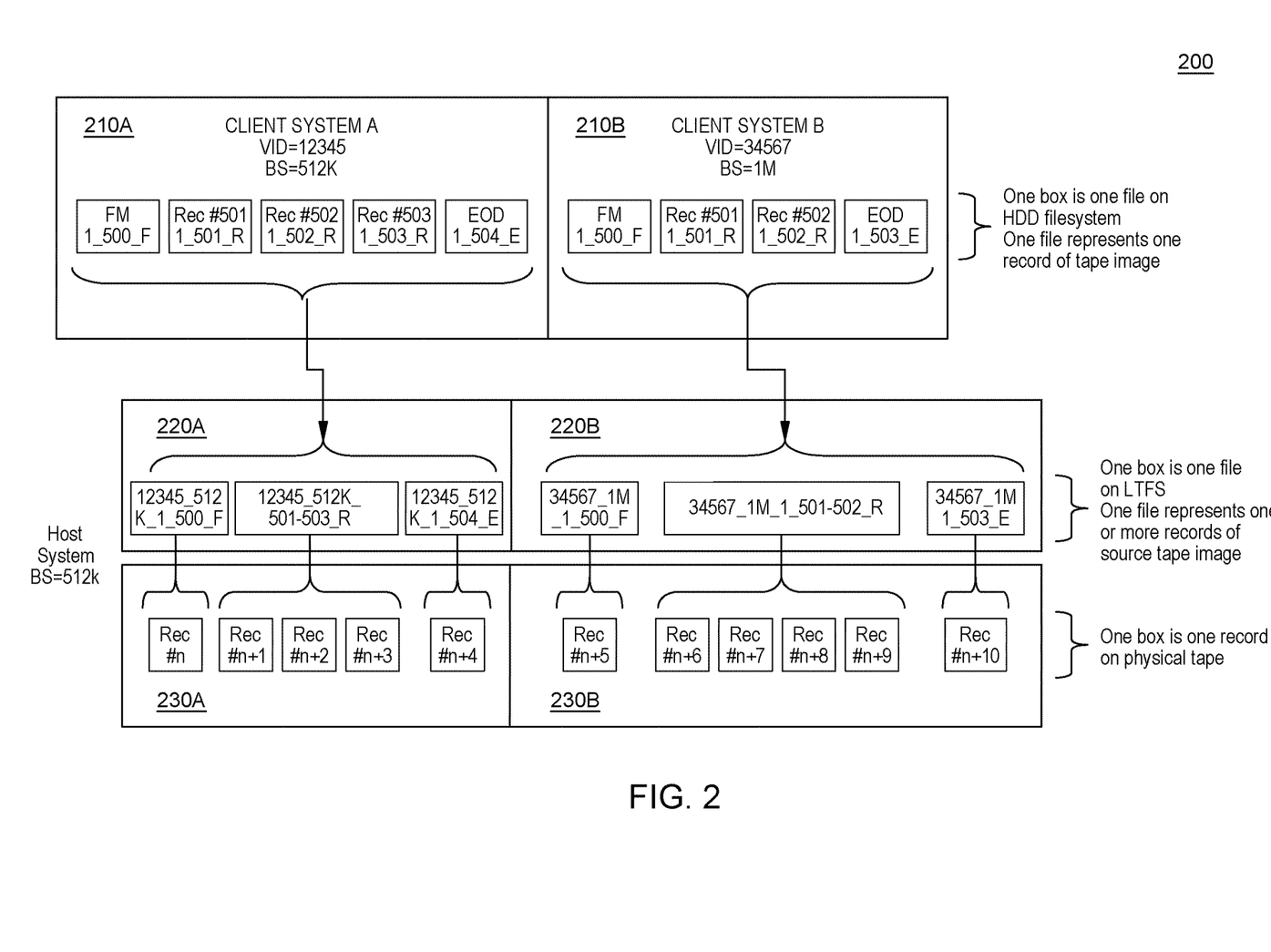
FIG. 2 is a block diagram illustrating exemplary file system data stored in data duplexing computing environment 100 of FIG. 1, generally designated 200, in accordance with at least one embodiment of the present invention.

FIG. 2 is a block diagram illustrating exemplary file system data stored in data duplexing computing environment 100 of FIG. 1, generally designated 200, in accordance with at least one embodiment of the present invention. As depicted in FIG. 2, various file data is stored on data partition #1 210A of tape image 142A (depicted in FIG. 1) and data partition #1 210B of tape image 142B (depicted in FIG. 1). In an embodiment, one box represents one file on an HDD filesystem, such as a filesystem corresponding to HDD 140A or HDD 140B (depicted in FIG. 1). In an embodiment, one file on a filesystem corresponding to HDD 140A or HDD 140B represents one record stored on a tape image, such as tape image 142A or tape image 142B.

TDECs 162A and 162B (depicted in FIG. 1) convert write requests from applications 114A and 114B to tape images 142A and 142B stored on HDDs 140A and 140B, respectively. For example, TDECs 162A and 162B convert file data (which includes the following attributes: (i) a data record (i.e., record #), (ii) a file mark (FM), and (iii) an end of data (EOD) mark) into the following LTFS file format: [partition]_ [record number]_[record type]. The partition identifies the directory to which the data is written, and the record number and record type identifies the particular file and file content, respectively. The type of data written to a tape image may include "record (Rec #)," "file mark (FM)," and End-of-Data (EOD) mark," which are logical data types on a tape, and have the following meaning, respectively:
(i) Record (Rec #): a data string having a particular length. TDECs 162A and 162B read and write data on a record by record basis;
(ii) File Mark (FM): a file separator with a length of 0 which represents the beginning of one or more records included in a file; and
(iii) End-of-Data (EOD) Mark: A separator which represents the end of a file.

TDEC 162A has written the following file data to data partition #1 210A of tape image 142A on HDD 140A:
Partition=1, Record Number=500, Record Type=FM: 1_500_F
Partition=1, Record Number=501, Record Type=Rec: 1_501_R
Partition=1, Record Number=502, Record Type=Rec: 1_502_R Partition=1, Record Number=503, Record Type=Rec: 1_503_R Partition=1, Record Number=504, Record Type=EOD: 1_504_E Similarly, TDEC 162B has written the following file data to data partition #1 210B of tape image 142B on HDD 140B:

Partition=1, Record Number=500, Record Type=FM: 1_500_F

Partition=1, Record Number=501, Record Type=Rec: 1_501_R

Partition=1, Record Number=502, Record Type=Rec: 1_502_R

Partition=1, Record Number=503, Record Type=EOD: 1_503_R

As further depicted by FIG. 2, TDECs 162A and 162B append a volume identifier (VID) and block size (BS) corresponding to data written on data partition #1 210A of tape image 142A and data partition #1 210B of tape image 142B and records the data as an LTFS file. In an embodiment, one box represents one file on a LTFS. In an embodiment, one file represents one or more records of a source tape image.

For example, if records 500-504 written to tape image 142A are all part of the same volume (e.g., volume 123456) having a BS of 512K, then TDEC 162A records the records as the following LTFS files:

Partition=1|Record Number=500|Type=FM→123456_512K_1_500_F

Partition=1|Record Number=501-503|Type=R→123456_512K_1_501-503_R

Partition=1|Record Number=504|Type=EOD→123456_512K_1_504_E

Similarly, if records 500-503 written to tape image 142B are all part of the same volume (e.g., volume 34567) having a BS of 1M, then TDEC 162B records the records as the following LTFS files, generally designated 220A:

Partition=1|Record Number=500|Type=FM→34567_1M_1_500_F

Partition=1|Record Number=501-502|Type=R→34567_1M_1_501-502_R

Partition=1|Record Number=503|Type=EOD→34567_1M_1_503E

Data duplexing program 101 writes file data copied from tape image 142A and 142B by MC 164A and MC 164B, respectively, to tape 180 (depicted in FIG. 1). In an embodiment, one box represents one record written to tape 180. Data duplexing program 101 has written the following file data corresponding to volume 123456 and received from MC 164A to tape 180, generally designated 230A:

123456_512K_1_500_F→Rec #n

123456_512K_1_501-503_R→Rec #n+1, Rec #n+2, Rec #n+3

123456_512K_1_501-503_E→Rec #n+4

Similarly, data duplexing program 101 has written the following file data corresponding to volume 34567 and received form MC 164B to tape 180, generally designated 230B:

34567_1M_1_500_F→Rec #n+5

34567_1M_1_501-502_R→Rec #n+6, Rec #n+7, Rec #n+8, Rec #n+9

34567_1M_1_503_E→Rec #n+10

Figure 3:
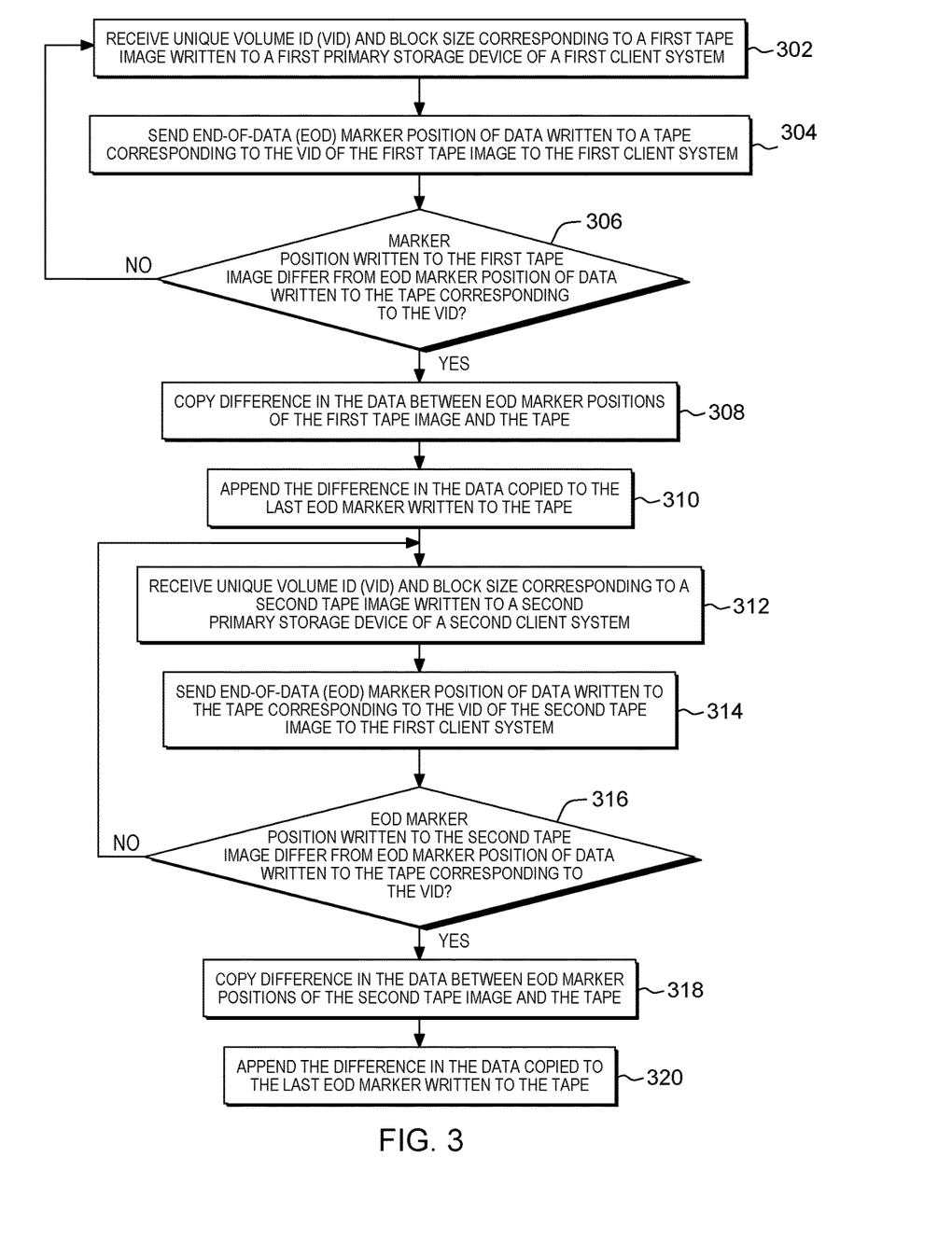
FIG. 3 is a flow chart diagram depicting operational steps for performing data duplexing in data duplexing computing environment 100 by a data duplexing program 101 in accordance with at least one embodiment of the present invention.

FIG. 3 is a flowchart diagram depicting operational steps for performing data duplexing of multiple file system data from a primary storage device to a tape drive acting as a secondary storage device by a data duplexing program 101 in accordance with at least one embodiment of the present invention. It should be appreciated that FIG. 3 provides only an illustration of one embodiment and does not imply any limitations with regard to the environments in which different embodiments may be implemented. Many modifications to the depicted environment may be made.

At step 302, data duplexing program 101 receives a unique volume identifier (VID) and a LTFS block size (BS) corresponding to a first tape image stored on a first primary storage device of a first client system. In an embodiment, the first primary storage device of the first client system is a HDD. For example, data duplexing program 101, located on host system 120, receives the VID and LTFS BS corresponding to tape image 142A stored on HDD 140A, from a mirroring component, such as MC 164A, located on client system 110A.

At step 304, in response to receiving the VID and BS of the first tape image from the first client system, data duplexing program 101 transmits an EOD position on a tape corresponding to the VID to the client system. For example, data duplexing program 101, located on host system 120, transmits the EOD position on tape 180 corresponding to the VID of tape image 142A to MC 164A located on client system 110A.

At decision step 306, data duplexing program 101 determines whether an EOD position corresponding to data written to the first tape image differs from an EOD position of data written to the tape corresponding to the VID of the first tape image. For example, data duplexing program 101 determines whether an EOD position corresponding to data written to tape image 142A on HDD 140A exceeds a position of data written to tape 180 corresponding to the VID of tape image 142A.

In response to determining that the EOD position corresponding to data written to the first tape image does not differ from the EOD position of data written to the shared tape corresponding to the VID of the first tape image (decision step "NO" branch), data duplexing program 101 returns to step 302 and waits for receipt of the VID and BS of the first tape image from the first client system at a future point in time. In an embodiment, the VID and BS of a tape image is asynchronously retransmitted to data duplexing program 101 based on a predetermined time interval. For example, a mirroring component, such as MC 164A, located on client system 110A, asynchronously transmits the VID and LTFS BS corresponding to tape image 142A stored on HDD 140A to data duplexing program 101 located on host system 120. In response to determining that the EOD position corresponding to data written to the first tape image differs from the EOD position of data written to the tape corresponding to the VID of the first tape image (decision step "YES" branch), data duplexing program 101 proceeds to step 308.

At step 308, in response to determining that the EOD position corresponding to the data written to the first tape image differs from the EOD position of the data written to the tape corresponding to the VID of the first tape image, data duplexing program 101 copies the difference in the data between EOD positions on the first tape image and the tape. In an embodiment, a mirroring component located on the first client system associated with the tape image copies the difference in the data between the EOD positions of the first tape image and the tape. For example, MC 164A located on client system 110A copies the difference in the data between an EOD position on tape image 142A and an EOD position on tape 180 corresponding to the VID of tape image 142A.

At step 310, data duplexing program 101 writes the copy of the difference in the data between EOD positions on the first tape image and the tape to the tape. Because LTFS is an append-only file system, data duplexing program 101 always writes data as an append operation, beginning with the EOD of the first tape image. Therefore, if the EOD position of the first tape image differs from the EOD position on the tape corresponding to the VID of the first tape image, data duplexing program 101 writes the difference by appending one or more records starting from the EOD position on the tape corresponding to the VID of the first image, and ending with the EOD position on the primary storage device corresponding to the VID of the first tape image. For example, data duplexing program 101 appends the difference in the data between an EOD position on tape 180 corresponding to the VID of tape image 142A and the EOD position on HDD 140A corresponding to the VID of tape image 142A to the last EOD position on data partition 184 of tape 180. In an embodiment, writing the copy of the difference in the data between EOD positions further includes overwriting the data included in an index partition of the tape to include the meta-data of the file data written to the tape. For example, data duplexing program 101 overwrites the data included in index partition 182 of tape 180 to include the metadata-data corresponding to the difference in the data between the two EOD positions on HDD 140A and tape 180 associated with the VID of the tape image 142A.

At step 312, data duplexing program 101 receives a unique volume identifier (VID) and LTFS block size (BS) corresponding to a second tape image stored on a second primary storage device associated with a second client system. In an embodiment, the second primary storage device of the second client system is a HDD. For example, data duplexing program 101, located on host system 120, receives the VID and LTFS BS corresponding to tape image 142B stored on HDD 140B, from a mirroring component, such as MC 164B, located on client system 110B.

At step 314, in response to receiving the VID and BS corresponding to the second tape image from the second client system, data duplexing program 101 transmits an EOD position on a tape corresponding to the VID to the second client system. For example, data duplexing program 101, located on host system 120, transmits the EOD position on tape 180 corresponding to the VID of tape image 142B to MC 164b located on client system 110B.

At decision step 316, data duplexing program 101 determines whether an EOD position corresponding to data written to the second tape image differs from an EOD position of data written to the tape corresponding to the VID of the second tape image. For example, data duplexing program 101 determines whether an EOD position corresponding to data written to tape image 142B on HDD 140B exceeds an EOD position of data written to tape 180 corresponding to the VID of tape image 142B.

In response to determining that the EOD position corresponding to data written to the second tape image does not differ from the EOD position of data written to the tape corresponding to the VID of the second tape image (decision step "NO" branch), data duplexing program 101 returns to step 312 and waits for receipt of the VID and BS of the second tape image from the second client system at a future point in time. In an embodiment, the VID and BS of a tape image is asynchronously retransmitted to data duplexing program 101 based on a predetermined time interval. For example, a mirroring component, such as MC 164B, located on client system 110B, asynchronously transmits the VID and LTFS BS corresponding to tape image 142B stored on HDD 140B to data duplexing program 101 located on host system 120. In response to determining that the EOD position corresponding to data written to the second tape image differs from the EOD position of data written to the tape corresponding to the VID of the second tape image (decision step "YES" branch), data duplexing program 101 proceeds to step 318.

At step 318, in response to determining that the EOD position corresponding to the data written to the second tape image differs from the EOD position of the data written to the tape corresponding to the VID of the second tape image, data duplexing program 101 copies the difference in the data between EOD positions on the second tape image and the tape. In an embodiment, a mirroring component located on the second client system copies the difference in the data between the EOD positions of the second tape image and the tape. For example, MC 164B located on client system 110B copies the difference in the data between an EOD position on tape image 142B and an EOD position of data on tape 180 corresponding to the VID of tape image 142B.

At step 320, data duplexing program 101 writes the copy of the difference in the data between EOD positions on the second tape image and the tape to the tape. Because LTFS is an append-only file system, data duplexing program 101 always writes data as an append operation, beginning with the EOD of the second tape image. Therefore, if the EOD position of the second tape image differs from the EOD position of data on the tape corresponding to the VID of the data tape image, data duplexing program 101 writes the difference by appending one or more records starting from the EOD position of data on the tape corresponding to the VID of the second tape image, and ending with the EOD position of data written to the second primary storage device corresponding to the VID of the second tape image. For example, data duplexing program 101 appends the difference in the data between an EOD position of data on tape 180 corresponding to the VID of tape image 142B and the EOD position of data on HDD 140B corresponding to the VID of tape image 142B to the last EOD position written to data partition 184 of tape 180. In an embodiment, writing the copy of the difference in the data between EOD positions further includes overwriting the data included in an index partition of the tape to include the meta-data of the file data written to the tape. For example, data duplexing program 101 overwrites the data included in index partition 182 of tape 180 to include the metadata-data corresponding to the difference in the data between the two EOD positions on HDD 140B and tape 180 associated with the VID of the tape image 142B.

It should be appreciated that copies in the difference in file data between different primary storage devices of different client systems may be stored as backup data on a single, shared tape. Accordingly, the number of tape drives and tape media required for backing up data to tape is greatly reduced.

FIG. 4 is a block diagram depicting components of a computing device, generally designated 400, suitable for executing data duplexing program 101 in accordance with at least one embodiment of the invention. Computing device 400 includes one or more processor(s) 404 (including one or more computer processors), communications fabric 402, memory 406 including, RAM 416 and cache 418, persistent storage 408, communications unit 412, I/O interface(s) 414, display 422, and external device(s) 420. It should be appreciated that FIG. 4 provides only an illustration of one embodiment and does not imply any limitations with regard to the environments in which different embodiments may be implemented. Many modifications to the depicted environment may be made.

As depicted, computing device 400 operates over communications fabric 402, which provides communications between computer processor(s) 404, memory 406, persistent storage 408, communications unit 412, and input/output (I/O) interface(s) 414. Communications fabric 402 can be implemented with any architecture suitable for passing data or control information between processor(s) 404 (e.g., microprocessors, communications processors, and network processors), memory 406, external device(s) 420, and any other hardware components within a system. For example, communications fabric 402 can be implemented with one or more buses.

Memory 406 and persistent storage 408 are computer readable storage media. In the depicted embodiment, memory 406 includes random-access memory (RAM) 416 and cache 418. In general, memory 406 can include any suitable volatile or non-volatile one or more computer readable storage media.

Program instructions for data duplexing program 101 can be stored in persistent storage 408, or more generally, any computer readable storage media, for execution by one or more of the respective computer processor(s) 404 via one or more memories of memory 406. Persistent storage 408 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 can include one or more network interface cards. Communications unit 412 may provide communications through the use of either or both physical and wireless communications links. In the context of some embodiments of the present invention, the source of the various input data may be physically remote to computing device 400 such that the input data may be received, and the output similarly transmitted via communications unit 412.

I/O interface(s) 414 allows for input and output of data with other devices that may operate in conjunction with computing device 400. For example, I/O interface(s) 414 may provide a connection to external device(s) 420, which may be as a keyboard, keypad, a touch screen, or other suitable input devices. External device(s) 420 can also include portable computer readable storage media, for example thumb drives, portable optical or magnetic disks, and memory cards. Software and data used to practice embodiments of the present invention can be stored on such portable computer readable storage media and may be loaded onto persistent storage 408 via I/O interface(s) 414. I/O interface(s) 414 also can similarly connect to display 422. Display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
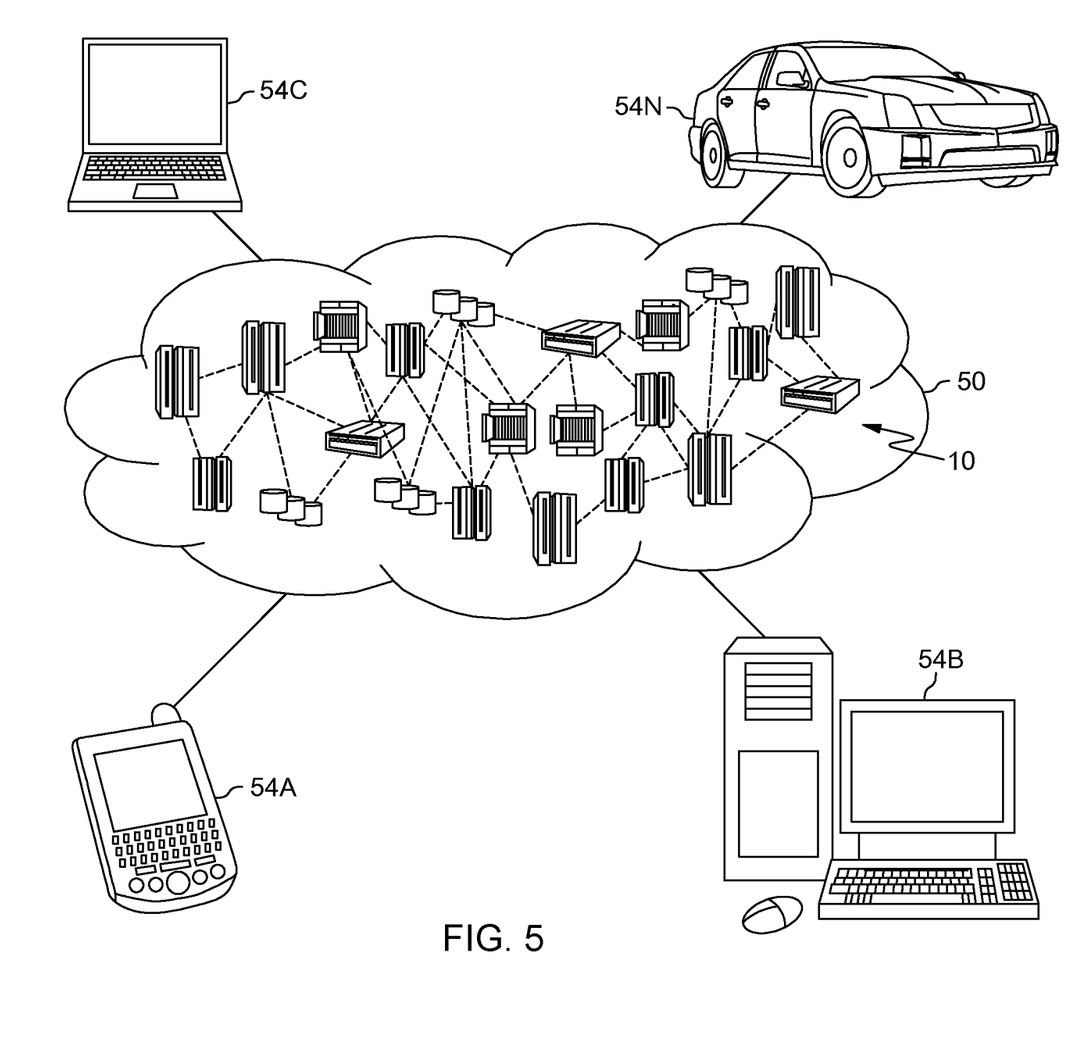
FIG. 5 is a block diagram depicting a cloud computing environment 50 in accordance with at least one embodiment of the present invention.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
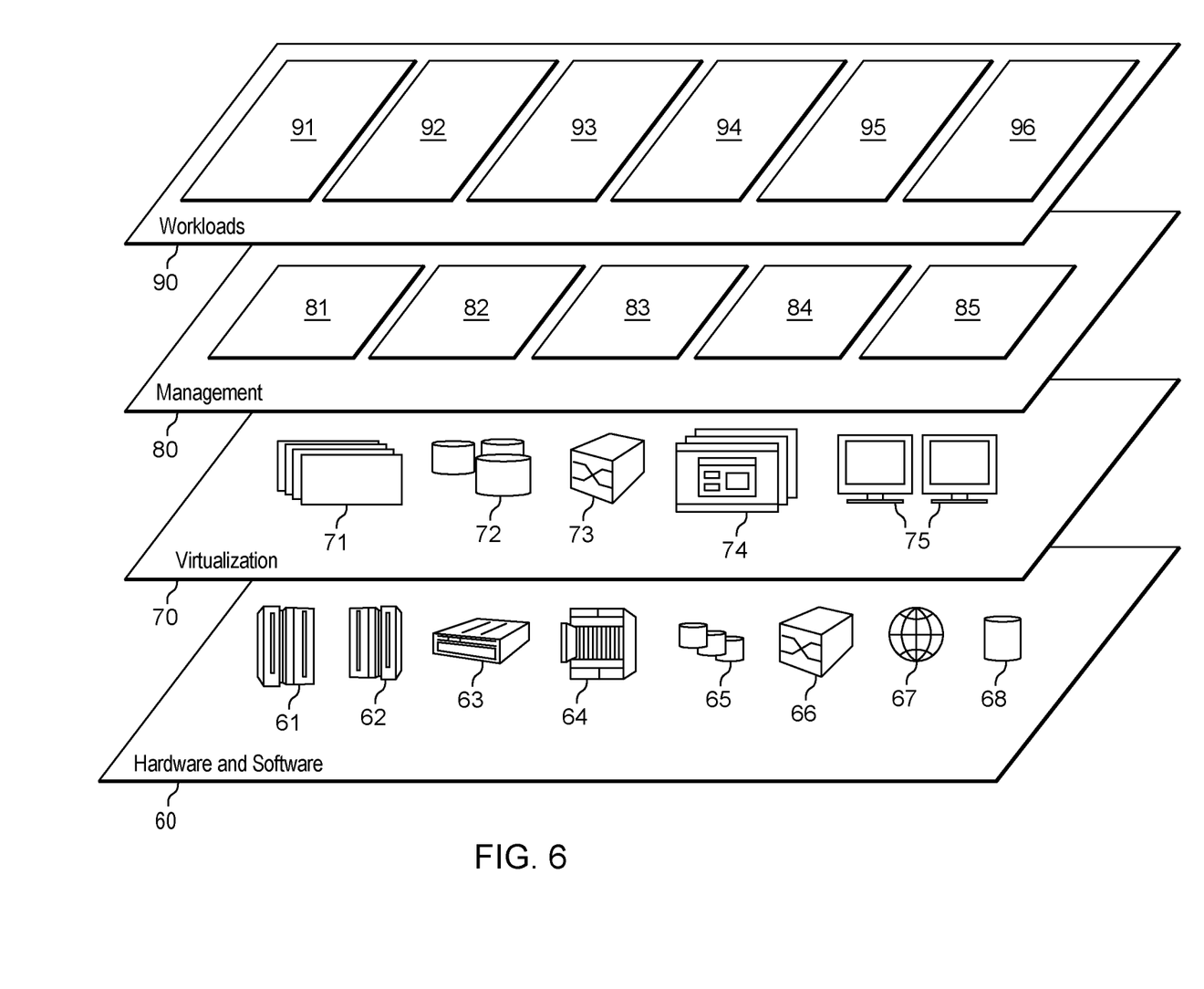
FIG. 6 is block diagram depicting a set of functional abstraction model layers provided by cloud computing environment 50 (depicted in FIG. 5) in accordance with at least one embodiment of the present invention.

FIG. 6 is block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data duplexing 96.

What is claimed is:

1. A computer-implemented method for duplexing data from multiple file systems onto a shared tape, the computer-implemented method comprising:
   receiving a unique identifier of a first tape image written to a primary storage device of a first client system;
   determining that a position of a first end-of-data marker on the first tape image differs from a position of a second end-of-data marker on a tape corresponding to the unique identifier of the first tape image; and
   responsive to determining that the position of the first end-of-data marker on the first tape image differs from the position of the second end-of-data marker on the tape corresponding to the unique identifier of the first tape image:
      copying a difference in data between the second end-of-data marker on the tape and the first end-of-data marker on the first tape image to the tape.

2. The computer-implemented method of claim 1, copying a difference in the data between the second end-of-data marker on the tape and the first end-of-data marker on the tape image to the tape further includes:
   appending the copied difference in the data between the second end-of-data marker on the tape and the first end-of-data marker on the tape image to a last end-of-data marker on the tape.

3. The computer-implemented method of claim 2, wherein the last end-of-data marker on the tape corresponds to data copied from a second tape image written to a different primary storage device of a second client system.

4. The computer-implemented method of claim 3, wherein a block size of the first tape image is different than a block size of the second tape image.

5. The computer-implemented method of claim 1, further comprising:
   recording the difference in the data between the second end-of-data marker on the tape and the first end-of-data marker on the tape image to a last end-of-data marker on the tape copied to the tape as one or more linear tape file system files, wherein the one or more linear tape file system files having the following filename format: tape image unique identifier_tape image block size_record number_record type.

6. The computer-implemented method of claim 1, wherein a difference in the data between the second end-of-data marker on the tape and the first end-of-data marker on the first tape image indicates changes made to the first tape image written to the primary storage device that have yet to be copied to the tape.

7. The computer-implemented method of claim 1, wherein the primary storage device is a random access, block storage device having a file system formatted in accordance with a linear tape file system, and the tape is a magnetic tape cartridge having a file system formatted in accordance with a linear tape file system.

8. A computer program product for duplexing data from multiple files systems onto a shared tape, the computer program product comprising one or more computer readable storage media and program instructions stored on the one or more computer readable storage media, the program instructions including instructions to:
  receive a unique identifier of a first tape image written to a primary storage device of a first client system;
  determine that a position of a first end-of-data marker on the first tape image differs from a position of a second end-of-data marker on a tape corresponding to the unique identifier of the first tape image; and
  responsive to determining that the position of the first end-of-data marker on the first tape image differs from the position of the second end-of-data marker on the tape corresponding to the unique identifier of the first tape image:
    copy a difference in data between the second end-of-data marker on the tape and the first end-of-data marker on the first tape image to the tape.

9. The computer program product of claim 8, wherein the program instructions to copy a difference in the data between the second end-of-data marker on the tape and the first end-of-data marker on the tape image to the tape further include instructions to:
  append the copied difference in the data between the second end-of-data marker on the tape and the first end-of-data marker on the tape image to a last end-of-data marker on the tape.

10. The computer program product of claim 9, wherein the last end-of-data marker on the tape corresponds to data copied from a second tape image written to a different primary storage device of a second client system.

11. The computer program product of claim 10, wherein a block size of the first tape image is different than a block size of the second tape image.

12. The computer program product of claim 8, further comprising program instructions to:
  record the difference in the data between the second end-of-data marker on the tape and the first end-of-data marker on the tape image to a last end-of-data marker on the tape copied to the tape as one or more linear tape file system files, wherein the one or more linear tape file system files having the following filename format: tape image unique identifier_tape image block size_record number_record type.

13. The computer program product of claim 8, wherein a difference in the data between the second end-of-data marker on the tape and the first end-of-data marker on the first tape image indicates changes made to the first tape image written to the primary storage device that have yet to be copied to the tape.

14. The computer program product of claim 8, wherein the primary storage device is a random access, block storage device having a file system formatted in accordance with a linear tape file system, and the tape is a magnetic tape cartridge having a file system formatted in accordance with a linear tape file system.

15. A computer system for duplexing data from multiple file systems onto a shared tape, the computer system comprising:
  one or more computer processors;
  one or more computer readable storage media;
  computer program instructions, the computer program instructions being stored on the one or more computer readable storage media for execution by the one or more computer processors; and
  the computer program instructions including instructions to:
    receive a unique identifier of a first tape image written to a primary storage device of a first client system;
    determine that a position of a first end-of-data marker on the first tape image differs from a position of a second end-of-data marker on a tape corresponding to the unique identifier of the first tape image; and
    responsive to determining that the position of the first end-of-data marker on the first tape image differs from the position of the second end-of-data marker on the tape corresponding to the unique identifier of the first tape image:
      copy a difference in data between the second end-of-data marker on the tape and the first end-of-data marker on the first tape image to the tape.

16. The computer system of claim 15, wherein the program instructions to copy a difference in the data between the second end-of-data marker on the tape and the first end-of-data marker on the tape image to the tape further include instructions to:
  append the copied difference in the data between the second end-of-data marker on the tape and the first end-of-data marker on the tape image to a last end-of-data marker on the tape.

17. The computer system of claim 16, wherein the last end-of-data marker on the tape corresponds to data copied from a second tape image written to a different primary storage device of a second client system.

18. The computer system of claim 17, wherein a block size of the first tape image is different than a block size of the second tape image.

19. The computer system of claim 15, further comprising program instructions to:
  record the difference in the data between the second end-of-data marker on the tape and the first end-of-data marker on the tape image to a last end-of-data marker on the tape copied to the tape as one or more linear tape file system files, wherein the one or more linear tape file system files having the following filename format: tape image unique identifier_tape image block size_record number_record type.

20. The computer system of claim 15, wherein a difference in the data between the second end-of-data marker on the tape and the first end-of-data marker on the first tape image indicates changes made to the first tape image written to the primary storage device that have yet to be copied to the tape.

* * * * *